S. D. LECOMPTE.

Instrument for Opening Fruit Cans.

No. 2,851. Reissued Feb. 4, 1868.

Witnesses.

Chas Tusch

Wm Treurn

Inventor

S. D. Lecompte.

By Munn & Co.

Attys.

N. PETERS, Photo-Lithographer, Washington, D. C.

United States Patent Office.

E. H. BOURNE, E. DAMON, JR., AND H. M. KNOWLES, OF CLEVELAND, OHIO, ASSIGNEES OF SAMUEL D. LECOMPTE, OF LEAVENWORTH CITY, KANSAS.

*Letters Patent No.* 50,011, *dated September* 19, 1865; *reissue No.* 2,851, *dated February* 4, 1868.

IMPROVED INSTRUMENT FOR OPENING SEALED AND OTHER CANS.

The Schedule referred to in these Letters Patent and making part of the same.

TO ALL WHOM IT MAY CONCERN:

Be it known that SAMUEL D. LECOMPTE, of Leavenworth city, in the county of Leavenworth, and State of Kansas, invented a new and improved Instrument for Opening Fruit and other Sealed Cans; and we do hereby declare that the following is a full, clear, and exact description thereof, which will enable others skilled in the art to make and use the same, reference being had to the accompanying drawing, forming part of this specification, in which—

Similar letters of reference indicate like parts.

This invention consists in the construction of an instrument or machine for opening that class of cans used for putting up preserved fruits, nuts, oysters, paints, &c., the same consisting of a holder or handle, provided with a suitable knife or cutter, and having a point arranged in such a manner as to form an axial pivot for the cutter in opening the can, after the said point has been thrust through the can, as will hereafter be described.

To enable others to understand, make, and use my invention, we will proceed to describe it.

Figure 1:
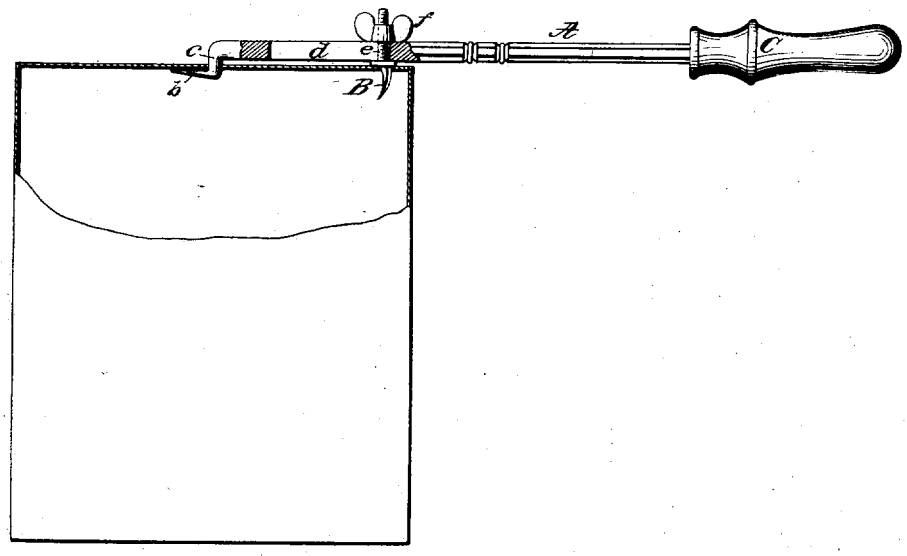
Figure 1 is a side view of the instrument with a part in section.
Figure 2:
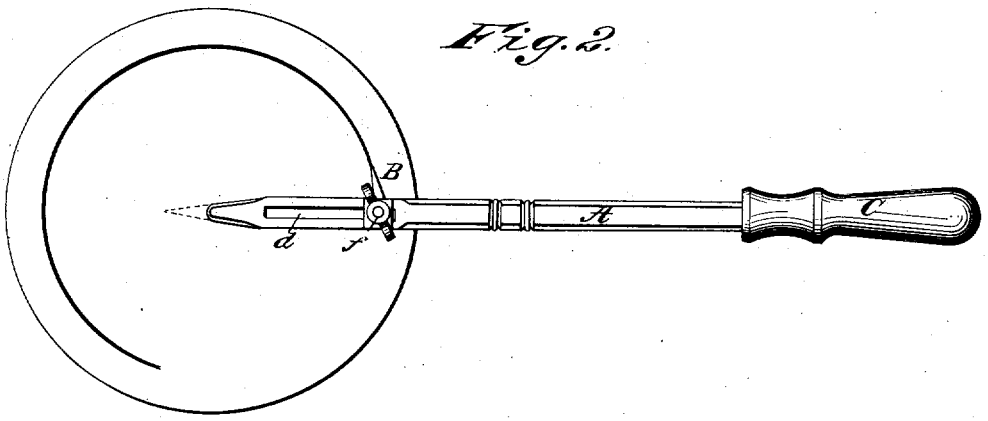
Figure 2 is a top view of the instrument.

A represents the holder or stem of the instrument, which is provided with a suitable handle, C. The point of the instrument is formed for piercing the can, and an axial pivot for the cutter, as shown by the letters *b c* in fig. 1. This enables the instrument to be thrust into the can in such a manner that the part *c*, which is bent at such angles to the holder A, as forms an axial pivot, encircled by the edges of the hole made in the can, thus insuring a good and sufficient bearing for the pivot while the instrument is being used. Through the holder A, a slot, *d*, is made, as shown in fig. 1. In this slot is fitted the shank *e*, of a knife or cutter, B, which has a set-screw, *f*, or its equivalent, on its upper end, by which to adjust and secure the knife at any desired place along the slot *d*. The knife is of such shape that it can be readily forced down through the tin, and will cut the same as the instrument is moved round for the purpose.

From this description it will be seen that we provide a cheap and convenient instrument for opening hermetically-sealed and other cans, and that it operates easily and satisfactorily.

We do not limit ourselves to the particular-shaped knife B, as we have adapted various styles; for instance, some with the point of the knife extending out before the holder, and others straight, and some with the point behind the holder, &c., all of which posses peculiar advantages not necessary here to mention.

What is claimed as new, and the invention of the said SAMUEL D. LECOMPTE, and which is desired to be secured by Letters Patent, is—

1. A can-opener, constructed of a cutter or knife, connected to a handle or holder, having a point so arranged in relation to said holder as to form an axial pivot for the cutter in opening cans.

2. The point, when so arranged in relation to the holder and cutter, that it acts as a point in perforating the can and an axial pivot for the cutter.

E. H. BOURNE,
E. DAMON, JR.,
H. M. KNOWLES,
*Assignees of said Samuel D. Lecompte.*

Witnesses:
W. H. BURRIDGE,
J. HOLMES.